(12) United States Patent
Wu et al.

(10) Patent No.: US 11,733,931 B1
(45) Date of Patent: Aug. 22, 2023

(54) SOFTWARE DEFINED HYBRID FLASH STORAGE MEMORY CONTROLLER

(71) Applicant: Meta Platforms, Inc., Menlo Park, CA (US)

(72) Inventors: Ta-Yu Wu, Fremont, CA (US); Akshat Nanda, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 183 days.

(21) Appl. No.: 16/927,507

(22) Filed: Jul. 13, 2020

(51) Int. Cl.
*G06F 3/06* (2006.01)
*G06F 12/0866* (2016.01)
*G06F 12/02* (2006.01)

(52) U.S. Cl.
CPC ............ *G06F 3/0679* (2013.01); *G06F 3/061* (2013.01); *G06F 3/0659* (2013.01); *G06F 12/0246* (2013.01); *G06F 12/0866* (2013.01)

(58) Field of Classification Search
CPC ...... G06F 3/0679; G06F 3/061; G06F 3/0659; G06F 12/0246; G06F 12/0866
See application file for complete search history.

(56) References Cited

U.S. PATENT DOCUMENTS

| | | | | |
|---|---|---|---|---|
| 10,877,900 B1* | 12/2020 | Muthiah | ............... | G06F 9/4411 |
| 2012/0246392 A1* | 9/2012 | Cheon | ................. | G06F 12/0873 |
| | | | | 711/E12.008 |
| 2014/0059275 A1* | 2/2014 | Yun | ...................... | G06F 12/0246 |
| | | | | 711/103 |
| 2015/0331624 A1* | 11/2015 | Law | ........................ | G06F 3/065 |
| | | | | 711/103 |
| 2016/0246726 A1* | 8/2016 | Hahn | ..................... | G06F 3/0613 |
| 2018/0101477 A1* | 4/2018 | Kan | .................... | G06F 12/0246 |
| 2018/0307847 A1* | 10/2018 | Lee | ........................ | H04L 9/0894 |
| 2019/0012094 A1* | 1/2019 | Li | ........................ | G06F 11/1012 |
| 2019/0034121 A1* | 1/2019 | Kuwamura | ........... | G06F 3/0679 |
| 2019/0188153 A1* | 6/2019 | Benisty | ................. | G06F 3/0611 |
| 2019/0196955 A1* | 6/2019 | Chang | ................... | G06F 3/0607 |
| 2020/0034234 A1* | 1/2020 | Wu | ...................... | G06F 11/1076 |
| 2020/0034298 A1* | 1/2020 | Benisty | ............... | G06F 12/0873 |
| 2020/0225875 A1* | 7/2020 | Oh | ........................ | G06F 3/0622 |
| 2020/0301780 A1* | 9/2020 | Kim | ..................... | G06F 11/1072 |

* cited by examiner

*Primary Examiner* — Francisco A Grullon
(74) *Attorney, Agent, or Firm* — Van Pelt, Yi & James LLP

(57) ABSTRACT

A central processing unit of a host system is used to manage at least a portion of a data placement of a storage device including by bypassing a storage controller processing unit of the storage device to store data in a random-access memory of the storage device while allowing media endurance management of the storage device to be managed by the storage controller processing unit of the storage device. The central processing unit of the host system to the storage device provides a command that causes the storage controller processing unit of the storage device to utilize the data stored by the central processing unit of the host system in the random-access memory of the storage device.

20 Claims, 5 Drawing Sheets

SOFTWARE DEFINED HYBRID FLASH STORAGE MEMORY CONTROLLER

BACKGROUND OF THE INVENTION

A solid-state drive (SSD) is a storage device that uses integrated circuits to store data. A SSD may be comprised of a storage controller processing unit, a cache memory (e.g., dynamic random-access memory), and flash storage memory. Typically, the storage controller processing unit of the SSD receives and handles commands to store data as well as the contents of the data to be stored. The storage controller processing unit also manages a flash translation layer (FTL) that is a mapping between a logical memory address and a physical storage location. The storage controller processing unit also performs media endurance management, including garbage collection, error correction (ECC), and error recovery tasks. However, the storage controller processing unit has a finite amount of available processing capabilities and may become a performance bottleneck. For example, if the SSD is inundated with a large number of storage requests for large amounts of data, the storage controller processing unit can struggle to receive and route the data in addition to performing all of its other tasks.

BRIEF DESCRIPTION OF THE DRAWINGS

Various embodiments of the invention are disclosed in the following detailed description and the accompanying drawings.

DETAILED DESCRIPTION

Figure 1:
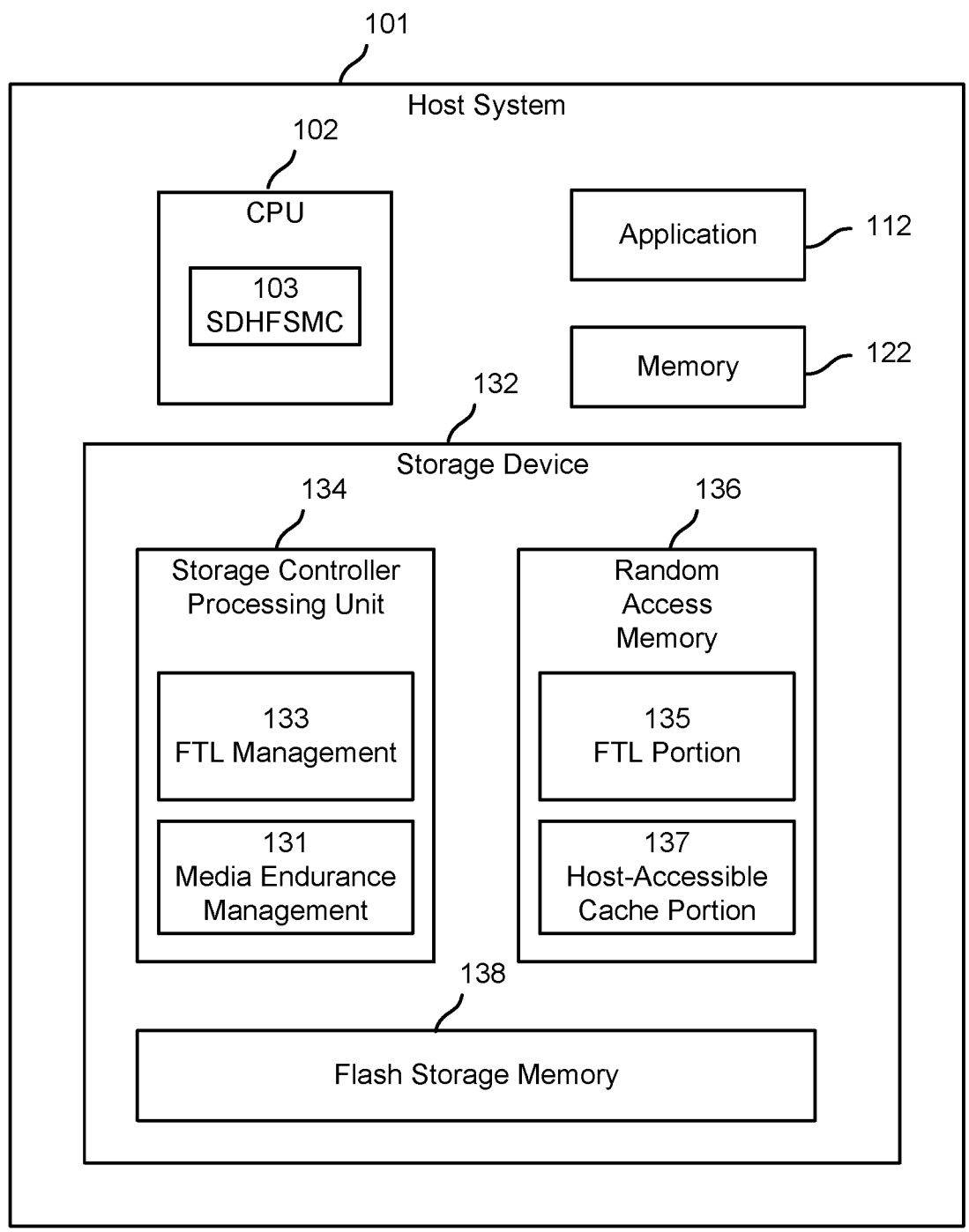
FIG. 1 is a block diagram illustrating a system for implementing a software defined hybrid flash storage memory controller in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

There are many techniques to reduce the likelihood that the storage controller processing unit becomes a bottleneck. One technique to reduce the burden on the storage controller processing unit is to give the host device full control on data placement by offloading the data placement control, media endurance management, and FTL management from the storage device to a central processing unit (CPU) of a host device. The CPU of the host device may perform FTL management and media endurance management. A random access memory of the host device may store the FTL. The CPU of the host device may include control software that controls where application content data is to be stored on the storage device. An application may send to a filesystem of the host device one or more commands to store application content data as well as the corresponding application content data. The file system may provide the one or more commands and the corresponding application content data to a block layer of the host device. Traditionally, the block layer of the host device provides the one or more commands and the corresponding application content data to a controller-storage interface (e.g., NVMe driver) of the host device, which then provides the one or more commands and the corresponding application content data to the storage controller processing unit of the storage device. Instead, the control software of the host device may intercept the one or more commands and the corresponding application content data. The control software may issue to the storage controller processing unit a command to store the corresponding application content data at one or more particular storage locations in the flash storage memory. In response to receiving the command and the corresponding application content data, the storage controller processing unit stores the corresponding application content data at the one or more particular storage locations. Although this reduces the burden on the storage controller processing unit, this technique may reduce the longevity of the storage device because the media endurance management performed by the CPU of the host device may not be as effective as if the media endurance management was performed by the storage controller processing unit. Furthermore, the CPU of the host device also has a finite amount of processing capabilities and may also become a performance bottleneck.

Another technique to reduce the burden on the storage controller processing unit is to split responsibilities between the host device and the storage device by offloading the data placement control and FTL management from the storage device to a host device, but allowing the storage controller processing unit of the storage device to remain in control of media endurance management. An application may send to a filesystem of the host device one or more commands to store application content data as well as the corresponding application content data. Control software on the host device may intercept the one or more commands and the corresponding application content data. The control software may issue a command to store the corresponding application content data at one or more particular storage locations in the flash storage memory.

The control software may provide the command and the corresponding application content data to a block layer of the host device, which in turn, provides the command and the corresponding application content data to a controller-storage interface. The controller-storage interface may provide the command and the corresponding application content data to the storage controller processing unit of the storage device. The storage controller processing unit of the storage device then stores the corresponding application content data in the storage device random-access memory and causes the corresponding application content data to be flushed from the storage device random-access memory to the flash storage memory of the storage device at the one or more particular storage location indicated in the command.

However, the host device and the storage device are unaware of each other's state and/or resource limitations. As a result, compute power and storage resources may be sub-optimally used. Furthermore, utilizing the host device's processing and memory resources may not be scalable over time as the storage device's capacity grows larger.

A technique to reduce the burden on the storage controller processing unit through the use of a software-defined hybrid flash storage memory controller (SDHFSMC) is disclosed. The SDHFSMC may offload some of the data placement responsibilities of a storage controller processing unit of a storage device to the CPU of the host device to reduce the likelihood that the storage controller processing unit of the storage device becomes a bottleneck. Instead of the storage controller processing unit of the storage device having full control over data placement, the storage controller processing unit of the storage device and the CPU of the host device may share the responsibility of data placement. The SDHFSMC may reside in the CPU of the host device.

The primary purpose of the random-access memory of the storage device is to store the FTL. The FTL stored in the random-access memory of a storage device may use a large portion (e.g., 85%) of the storage device random-access memory. The amount of space used by the FTL may be reduced by increasing a chunk size associated with the FTL. For example, a chunk size of the FTL may be increased from 4k to 16k or 64k. This enables a portion of the storage device random-access memory to be reused for other purposes, such as a cache for the SDHFSMC. The repurposed portion of the random-access memory of the storage device is accessible from the SDHFSMC via a bus interface (e.g., PCIe) and the storage controller processing unit. The repurposed portion of the storage device random-access memory may be referred herein as a "host-accessible cache portion" of the storage device random-access memory.

An application may provide to a filesystem of the host device one or more commands to store application content data as well as the corresponding application content data. As discussed above, the filesystem of other storage systems may provide the one or more commands and the corresponding application content data to a block layer associated with an operating system of the host device, which in turn, provides the one or more commands and the corresponding application content data to a controller-storage interface. The controller-storage interface may provide the one or more commands and the corresponding application content data to the storage controller processing unit of the storage device. The storage controller processing unit of the storage device then stores the application content data in the storage device random- access memory and causes the application content data to be flushed from the storage device random-access memory to the flash storage memory of the storage device. The storage controller processing unit of the storage device may receive the corresponding application content data out- of-sequence and as a result, the corresponding application content data is stored in the flash storage memory out-of-sequence. This may lead to write amplification.

In contrast, instead of the filesystem providing the corresponding application content data to the block layer of the host device, the SDHFSMC may intercept the one or more commands and the corresponding application content data from the filesystem. The SDHFSMC may bypass the block layer associated with an operating system of the host device and the controller-storage interface by providing the corresponding application content data to the host- accessible cache portion of the storage device random-access memory via a bus interface and the storage controller processing unit of the storage device. This is a faster data placement process because there are less processes that handle the application content data before the application content data is placed in the storage device random-access memory.

The application content data received by the SDHFSMC from the application may be out-of-sequence. That is, the application may send out a series of commands to store application content data and the corresponding application content data, but the order in which the series of commands is received by the SDFHSMC is different than the order sent out by the application. The SDHFSMC may organize and place the application content data in the host-accessible cache portion of the storage device random-access memory in a manner that is most optimal for the storage medium for which the application content data is to be stored, such as storing the application content data in-sequence. The ability to store data in-sequence, and to coalesce and organize the random data set into a larger contiguous dataset enables abstraction and management layers associated with a storage device, such as a flash storage device or other type of storage device, to be reduced or removed.

The SDHFSMC may provide an address associated with the host-accessible cache portion when providing the application content data to the storage controller processing unit of the storage device. In response to receiving the application content data and the associated address, the storage controller processing unit of the storage devices writes the data to the host-accessible cache portion of the storage device random-access memory at the address associated with the host-accessible cache portion, such that the application content data is stored in-sequence.

When a set of application content data is ready to be stored, the SDHFSMC may issue to the storage controller processing unit of the storage device a command to flush the application content data stored in the host-accessible cache portion of the storage device random-access memory to the flash storage memory of the storage device. In response to receiving the command, the storage controller processing unit of the storage device flushes the application content data to the flash storage memory of the storage device. This is a more efficient storage process for the storage controller processing unit of the storage device because the application content data stored in the storage memory random access memory is stored in-sequence. The storage controller processing unit may write the application content data to sequential memory addresses of the flash storage memory of the storage device. This may lead to improved performance and reduced write amplification.

FIG. 1 is a block diagram illustrating a system for implementing a software defined hybrid flash storage memory controller in accordance with some embodiments. In the example shown, system 100 includes a host system 101 that includes a CPU 102, an application 112, a memory 122, and a storage device 132. In some embodiments, application 112 is located outside of host system 101. CPU 102 includes SDHFSMC 103 that is configured to control data placement for data associated with application 112.

Storage device 132 may be a solid-state storage device or any other storage device that uses integrated circuits to store data. Storage device 132 includes storage controller processing unit 134, random access memory (RAM) 136, and flash storage memory 138. Storage controller processing unit 134 includes FTL management 133 and media endurance management 131. RAM 136 includes FTL portion 135 and a host-accessible cache portion 137. FTL portion 135 stores a mapping between a logical memory address associated with flash storage memory 138 and a physical storage location associated with flash storage memory 138. Flash storage memory 138 may be a NAND flash storage memory or a NOR flash storage memory.

FLT management 133 is responsible for updating the FLT stored in FTL portion 135. FLT management 133 is configured to inspect the FTL stored in FTL portion 135 when determining where to place/retrieve data in/from flash storage memory 138. For example, storage controller processing unit 134 may receive a request to write data in at a particular memory address. FTL management 133 may inspect the FTL stored in FTL portion 135 to determine a physical storage location to write the data.

Storage controller processing unit 134 is configured to implement media endurance management 131 to ensure longevity of flash storage memory 138. Media endurance management 131 may perform tasks, such as garbage collection, ECC, and error recovery. Media endurance management 131 may be configured to control where writes occur on flash storage memory 138 such that the writes to the cells of flash storage memory 138 are evenly distributed.

FTL portion 135 stores the FTL using a particular chunk size. The portion of memory 136 used by the FTL portion 135 may be reduced by changing the particular chunk size. Other systems may have a FTL with a chunk size of 4k. The chunk size associated with a FTL may be increased to a different chunk size, such as 16k or 64k. Changing the chunk size associated with the FTL enables a portion of memory 136 to be reused for other purposes, such as host-accessible cache portion 137.

Figure 2:
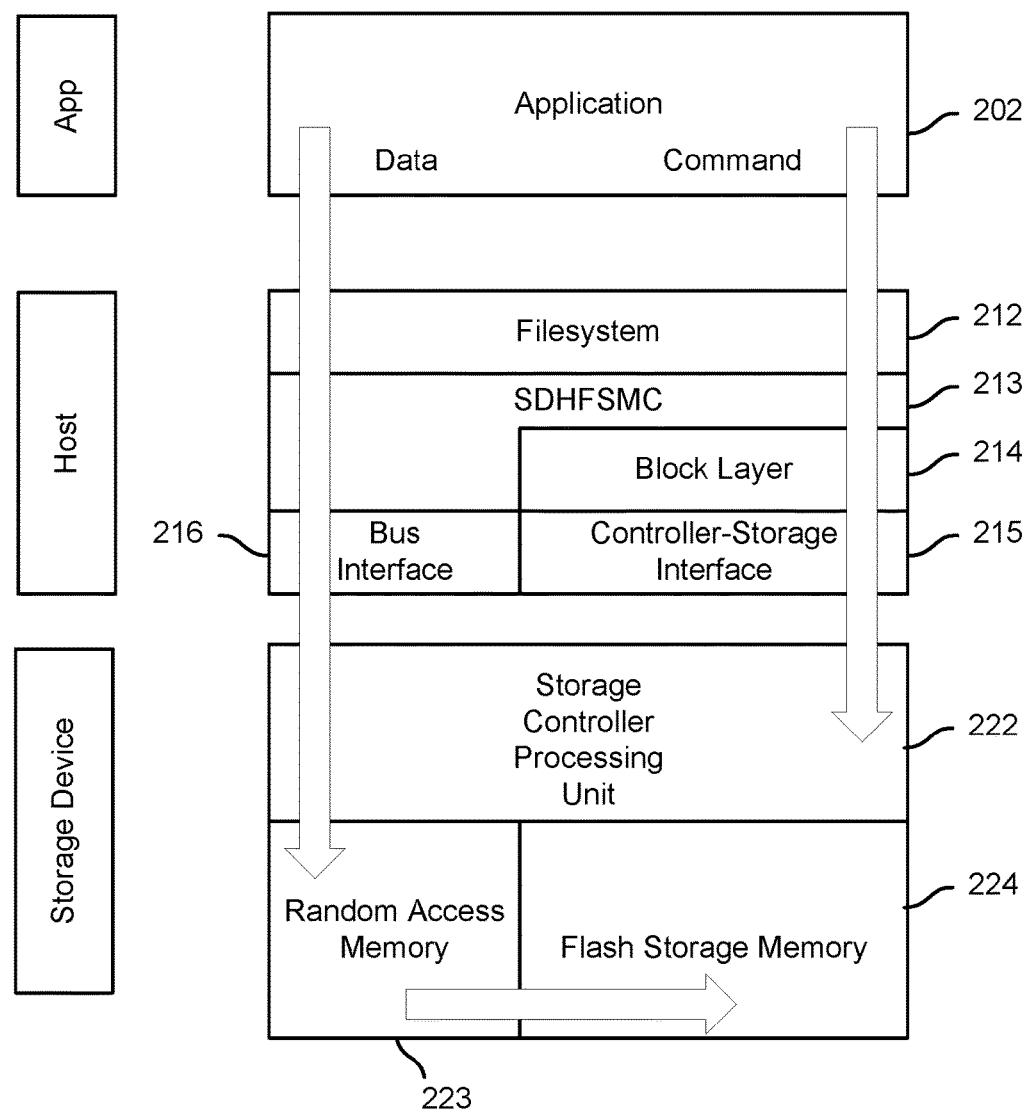
FIG. 2 is a diagram illustrating an example of data placement in accordance with some embodiments.

FIG. 2 is a diagram illustrating an example of data placement in accordance with some embodiments. In the example shown, an application 202 sends to filesystem 212 a command to store application content data and the content data associated with application 202. Filesystem 212 provides to SDHFSMC 213 the command to store content data and the content data associated with application 202. In other systems, file system 212 may provide the command to store application content data and the content data associated with application 202 to block layer 214, which then provides to controller-storage interface 215. Controller-storage interface 215 may then provide the command to store application content data and the content data associated with application 202 to storage controller processing unit 222.

In contrast, SDHFSMC 213 may bypass block layer 215 and controller-storage interface 215 by providing to storage controller processing unit 222, via bus interface 216 (e.g., PCIe), the content data associated with application 202 and an address associated with a host-accessible cache portion of random access memory 223. The host-accessible cache portion of random-access memory 223 may act as a staging area for SDHFSMC 213.

Application 202 may send out a series of commands to store content data, but the commands may be received out-of-sequence. As a result, the content data associated with application 202 may be stored out-of-sequence. SDHFSMC 213 may receive the content data associated with application 202 and provide to storage controller processing unit 222 the content data and an address associated with the host-accessible cache portion of random-access memory 223. In response to receiving the content data and the associated address, storage controller processing unit 222 may place the content data associated with application 202 in the host-accessible cache portion of random-access memory 223 such that the content data associated with application 202 is stored in-sequence.

After a certain amount of content data associated with application 202 is stored in-sequence in the host-accessible cache portion of random-access memory 223, SDHFSMC 213 may provide to storage controller processing unit 222, via block layer 214 and controller-storage interface 215, a command to flush the application content data stored in the host-accessible cache portion of random-access memory 223 to flash storage memory 224. In response to receiving the command, storage controller processing unit 222 may flush the application content data stored in the host-accessible cache portion of random-access memory 223 to flash storage memory 224. This may improve the performance of the storage device because storage controller processing unit 222 may write the content data associated with application 202 in-sequence. This also reduces the dependency of using resources of the host device to re-order the data on the host device and then send the re-ordered data to the storage device. Writing data out-of-sequence may increase the amount of time needed by storage controller processing unit 222 to flush the data from random-access memory 223 to flash storage memory 224. Writing data out-of-sequence may also cause write amplification. For example, 1 MB of out-of-sequence data may be written to the storage device. The storage device may clean up the out-of-sequence data by re-ordering the data and re-writing additional data that is already stored on the storage device. This may cause the storage device to write 3 MB total, which is a write amplification of 3.

Figure 3:
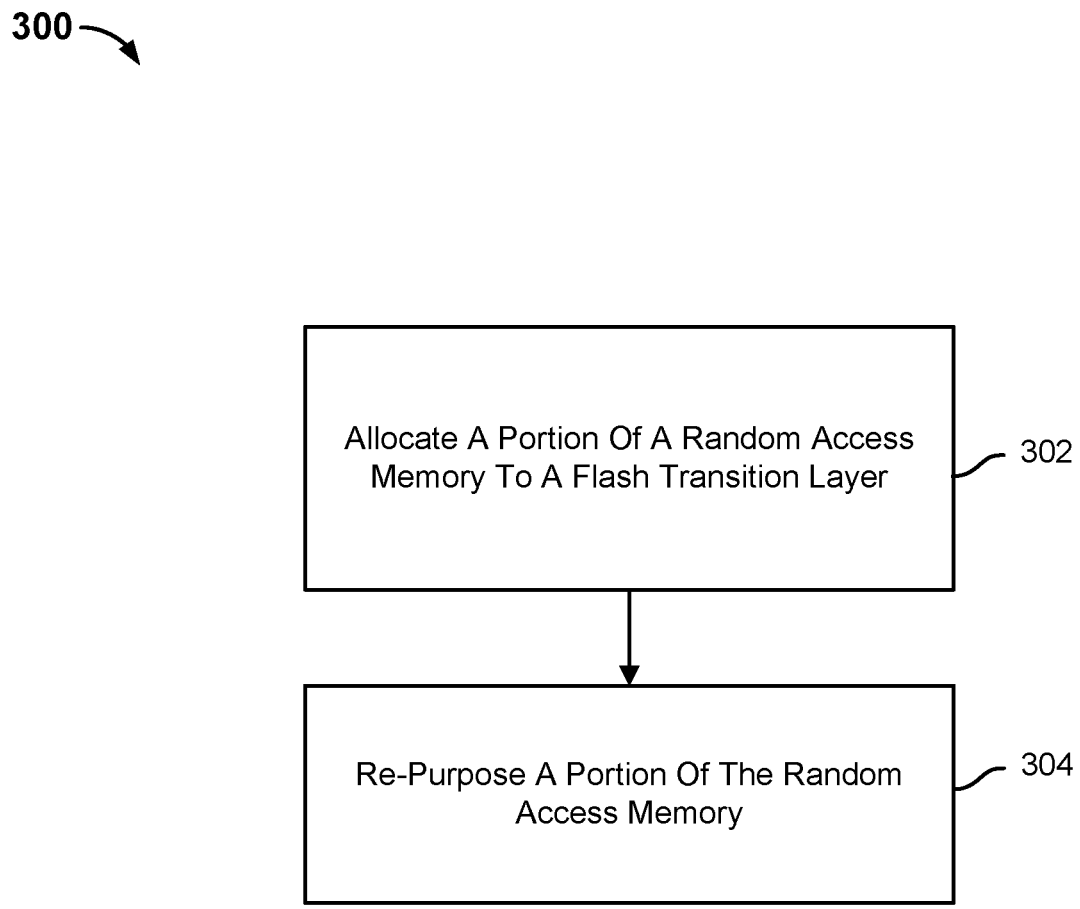
FIG. 3 is a flow chart illustrating a process for establishing a cache for a software defined hybrid flash controller in accordance with some embodiments.

FIG. 3 is a flow chart illustrating a process for establishing a cache for a software defined hybrid flash controller in accordance with some embodiments. In the example shown, process 300 may be implemented by storage device, such as storage device 132.

At 302, a portion of a random access memory is allocated to a flash transition layer. The FTL stored in the random-access memory of a storage device may use a large portion (e.g., 85%) of the storage device random-access memory. The amount of space used by the FTL may be reduced by increasing a chunk size associated with the FTL. For example, a chunk size of the FTL may be increased from 4k to 16k or 64k. This enables a portion of the storage device random-access memory to be reused for other purposes, such as a cache for the SDHFSMC.

In an example random access memory, a FTL with a chunk size of 4K may use 85% of the available storage in the random access memory. The chunk size associated with the FTL may be increased to enable the random access memory to be used for other purposes. Increasing the chunk size associated with the FTL decreases the amount of space used by the FTL in the random access memory. In some embodiments, the chunk size associated with the FTL is increased to 16k. In an example random access memory, this may reduce the amount of space used by the FTL from 85% to 20% and free up 65% of the random access memory for other purposes. In some embodiments, the chunk size associated with the FTL is increased to 64k. In an example random access memory, this may reduce the amount of space used by the FTL from 85% to 5% and free up 80% of the random access memory for other purposes.

At 304, a portion of the random access memory is re-purposed. In some embodiments, a portion of the random access memory is used as a host-accessible cache for a SDHFSMC. A size allocated to the flash transition layer portion is less than a size allocated to the host-accessible cache portion. In some embodiments, a portion of the random access memory is used to shape I/O commands to improve flash storage memory performance by reducing host write amplification and to provide more consistent flash storage memory performance through workload smoothing. In some embodiments, a portion of the random access memory is used as a debug buffer. For example, the debug buffer may be used to hold detailed historical host commands, SMART data, and device performance data for debugging and tuning purposes. In some embodiments, a portion of the random access memory is used as a read-ahead and pre-fetch buffer for quicker read access. In some embodiments, a portion of the random access memory is used as a separate application-accessible persistent memory region (PMR). For example, it may improve performance by doing small operations in PMR itself, i.e., small spends to the data, without fetching the data back in the host memory.

Figure 4:
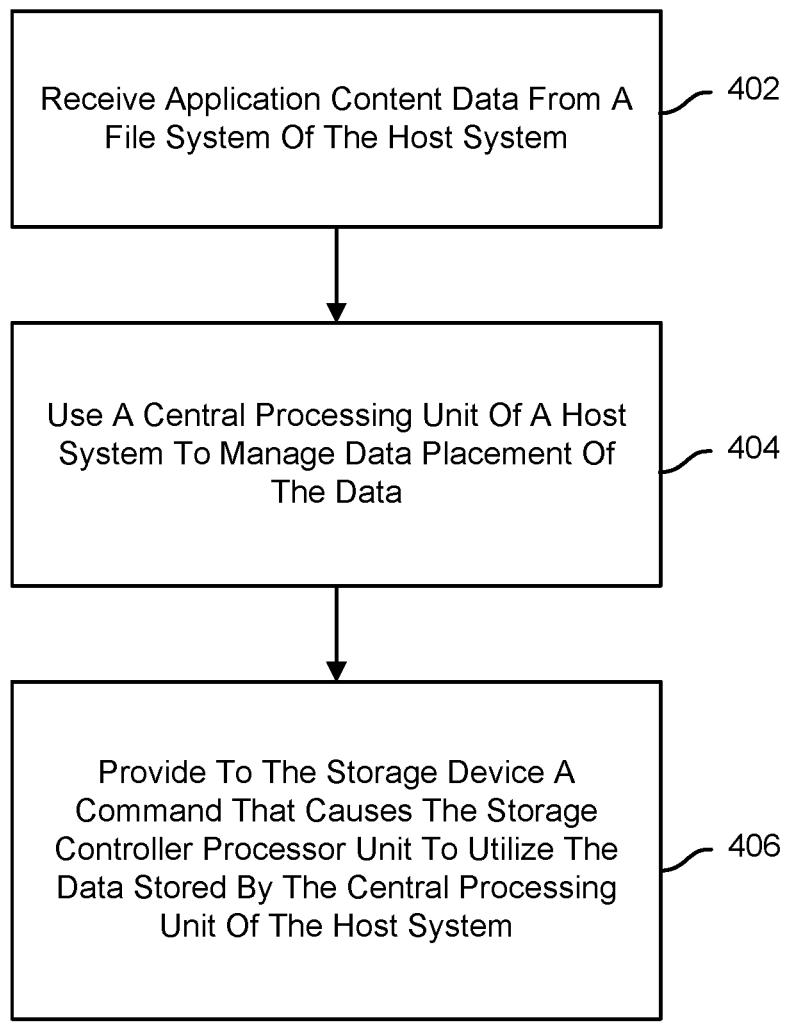
FIG. 4 is a flow chart illustrating a process for writing data to a storage device in accordance with some embodiments.

FIG. 4 is a flow chart illustrating a process for writing data to a storage device in accordance with some embodiments. In the example shown, process 400 may be implemented by a software defined hybrid flash storage memory controller, such as SDHFSMC 103 or SDHFSMC 213.

At 402, application content data is received from a filesystem of a host system. An application may be running on the host system or a device connected to the host system. The application may send to a storage device application content data and a command to store the application content data. The host system may have a filesystem, a SDHFSMC, a block layer, and a controller-storage interface (e.g., NVMe driver) in between the application and the storage device. The application content data and the write command may be provided from the application to the filesystem. The SDHFSMC may intercept the application content data and the command from the filesystem.

At 404, a central processing unit of the host system is used to manage data placement of the data. As discussed above, other systems may not have a SDHFSMC and instead provide the application content data and the command to the storage controller processing unit of the storage device via the block layer and controller-storage interface. The SDHFSMC may bypass the block layer and the controller-storage interface by providing the application content data to the storage controller processing unit of the storage device, via a bus interface, which in turn, stores the application content data in a host-accessible cache portion that is included in a random access memory of the storage device.

The content data received by the SDHFSMC from the application may be out-of-sequence. The SDHFSMC may organize and place the content data in the host-accessible cache portion of the random access memory of the storage device such that the data is in-sequence.

For example, the application may send to the storage controller processing unit of the storage device a first set of content data, a second set of content data, and a third set of content data. The SDHFSMC may first receive the third set of content data, the first set of content data, and then the second set of content data. The SDHFSMC may provide to the storage controller processing unit of the storage device the third set of content data and a first address associated with the host-accessible cache portion of the random access memory of the storage device (e.g., address "3"). The SDHFSMC may then provide to the storage controller processing unit of the storage device the second set of content data and a second address associated with the host-accessible cache portion of the random access memory of the storage device (e.g., address "2"). The SDHFSMC may then provide to the storage controller processing unit of the storage device the first set of content data and a third address associated with the host-accessible cache portion of the random access memory of the storage device (e.g., address "1").

In response to receiving a set of content data and an associated address, the storage controller processing unit of the storage device stores the received content data at the associated address of the host-accessible cache portion of the storage device random access memory. In the above example, the first set of content data is stored at address "1,", the second set of content data is stored at address "2," and the third set of content data is stored at address "3." Thus, the content data associated with the application is stored in-sequence in the host- accessible cache portion of the storage device random access memory.

At 406, a command that causes a storage controller processing unit to utilize the data stored by the central processing unit of the host system is provided. When a set of application content data is ready to be stored, the SDHFSMC may issue to the storage controller processing unit of the storage device a command to flush the data stored in the host-accessible cache portion of the storage device random-access memory to the flash storage memory of the storage device. In response to receiving the command, the storage controller processing unit of the storage device flushes the application content data to the flash storage memory of the storage device. This is a more efficient storage process for the storage controller processing unit of the storage device because the application content data is stored in the flash storage memory in-sequence.

Figure 5:
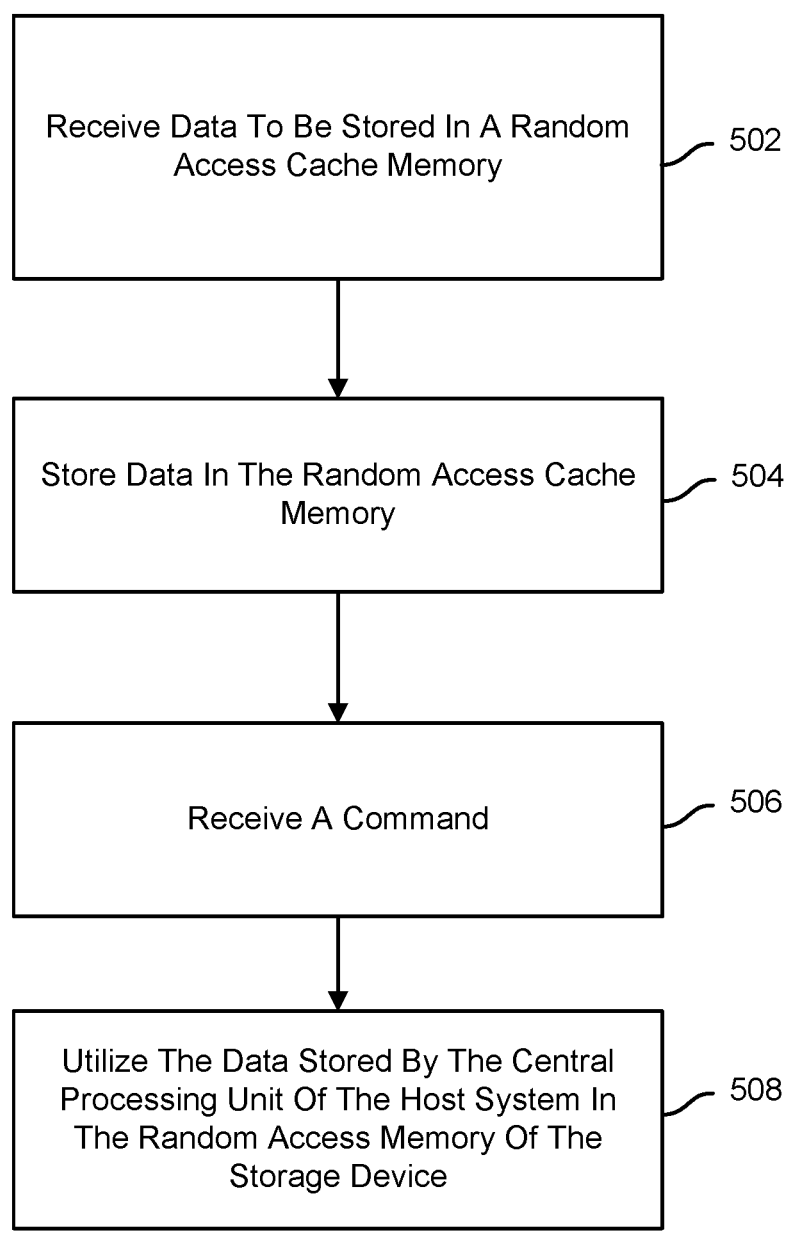
FIG. 5 is a flow chart illustrating a process for storing data in accordance with some embodiments.

FIG. 5 is a flow chart illustrating a process for storing data in accordance with some embodiments. In the example shown, process 500 may be implemented by a storage device, such as storage device 132.

At 502, data to be stored in a random access cache memory is received. A storage device may include a storage controller processing unit, a random access memory, and a flash storage memory. A portion of the random access memory may be used as a host-accessible cache storage for a SDHFSMC of a host device. The received data may include a command to store the data at a particular address of the random access cache memory.

At 504, the received data is stored at the particular address of the random access cache memory. At 506, a command to flush the data stored in the host-accessible cache storage of the random access memory is received. When a set of data is stored in the random access cache memory, a storage controller processing unit of the storage device may receive from the SDHFSMC of the host device a command to flush the data stored in the host-accessible cache storage of random access memory.

At 508, the data stored in the random access memory is utilized by flushing the data to a flash storage memory. In response to receiving the command, the storage controller processing unit of the storage device causes the set of data stored in the random access memory to be stored in the flash storage memory of the storage device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
using a central processing unit of a host system to manage at least a portion of a data placement of a storage device by bypassing at least a block layer of an operating system of the host system to store data in a volatile random-access memory of the storage device different from a non-volatile flash storage memory of the storage device while allowing media endurance management of the storage device to be managed by a storage controller processing unit of the storage device, wherein the volatile random-access memory of the storage device is configured to both cache the data including application content data and store flash transition layer information; and
providing a command via the central processing unit of the host system to the storage device that causes the storage controller processing unit of the storage device to store from the data stored by the central processing unit of the host system in the volatile random-access memory of the storage device to the non-volatile flash storage memory of the storage device, wherein due to the command the application content data cached in the volatile random-access memory storing the flash transition layer information of the storage device is flushed to the non-volatile flash storage memory, the application content data is different from the flash transition layer information, the volatile random-access memory is an internal memory of the storage device that is a storage drive, and the volatile random-access memory of the storage drive is different from a host system memory of the host system.

2. The method of claim 1, wherein the data is stored in the random-access memory via a peripheral component interconnect express (PCIe) bus.

3. The method of claim 1, wherein the command is provided to the storage device using a non-volatile memory express (NVMe) driver.

4. The method of claim 1, wherein the random-access memory of the storage device includes a host-accessible cache portion and a flash transition layer portion.

5. The method of claim 4, wherein a size allocated to the flash transition layer portion is less than a size allocated to the host-accessible cache portion.

6. The method of claim 1, wherein media endurance management includes at least one of: garbage collection, wear leveling, error correction, or error recovery.

7. The method of claim 1, wherein the central processing unit of the host system manages the at least the portion of the data placement of the storage device by organizing data stored in the random-access memory of the storage device.

8. The method of claim 7, wherein the central processing unit of the host system receives the data out-of-sequence.

9. The method of claim 8, wherein the data is organized in-sequence in the random-access memory of the storage device.

10. The method of claim 7, wherein organizing the data stored in the random-access memory of the storage device includes providing to the storage controller processing unit of the storage device an address associated with the random-access memory of the storage device at which the data is to be stored.

11. The method of claim 10, wherein in response to receiving the data, the storage controller processing unit of the storage device stores the data at the address associated with the random-access memory of the storage device.

12. The method of claim 1, wherein the data includes application content data.

13. The method of claim 1, further comprising intercepting from a filesystem of the host system the data and one or more commands to store the data.

14. The method of claim 1, wherein the data is stored in a host-accessible cache portion of the random-access memory.

15. The method of claim 1, wherein the command is provided to the storage device after a set of data is stored in the random-access memory.

16. The method of claim 1, wherein the storage controller processing unit manages the flash transition layer information.

17. The method of claim 1, wherein the storage device is a peripheral device removable from the host system.

18. A system, comprising:
a central processing unit configured to manage at least a portion of a data placement of a storage device by bypassing at least a block layer of an operating system of the system to store data in a volatile random-access memory of the storage device different from a non-volatile flash storage memory of the storage device while allowing media endurance management of the storage device to be managed by a storage controller processing unit of the storage device, wherein the volatile random-access memory of the storage device is configured to both cache the data including application content data and store flash transition layer information; and
a storage interface configured to provide to the storage device a command that causes the storage controller processing unit of the storage device to store from the data stored by the central processing unit in the volatile random-access memory of the storage device to the non-volatile flash storage memory of the storage device, wherein due to the command the application content data cached in the volatile random-access memory storing the flash transition layer information of the storage device is flushed to the non-volatile flash storage memory, the application content data is different from the flash transition layer information, the volatile random-access memory is an internal memory of the storage device that is a storage drive, and the volatile random-access memory of the storage drive is different from a host system memory of the system.

19. The system of claim 18, wherein a random-access memory of the storage device includes a host-accessible cache portion and a flash transition layer portion.

20. A method, comprising:
receiving data to be stored in a volatile random-access memory of a storage device different from a non-volatile flash storage memory of the storage device by bypassing at least a block layer of an operating system of a host system wherein the volatile random-access memory of the storage device is configured to both cache the data including application content data and store flash transition layer information and wherein a central processing unit of a host system manages at least a portion of a data placement of the storage device and media endurance management of the storage device is managed by a storage controller processing unit of the storage device;

receiving at the storage device a command provided via the central processing unit of the host system; and in response to the received command, storing from the data stored by the central processing unit of the host system in the volatile random-access memory of the storage device to the non-volatile flash storage memory of the storage device, wherein due to the command the application content data cached in the volatile random-access memory storing the flash transition layer information of the storage device is flushed to the non-volatile flash storage memory, the application content data is different from the flash transition layer information, the volatile random-access memory is an internal memory of the storage device that is a storage drive, and the volatile random-access memory of the storage drive is different from a host system memory of the host system.

* * * * *